United States Patent
Warner (10) Patent No.: US 9,399,444 B2
(45) Date of Patent: Jul. 26, 2016

(54) DEVICE FOR ADJUSTING TENSION IN SEAT BELTS AND OTHER RESTRAINT SYSTEM WEBS

(71) Applicant: Sidney B. Warner, Lancaster, PA (US)

(72) Inventor: Sidney B. Warner, Lancaster, PA (US)

( * ) Notice: Subject to any disclaimer, the term of this patent is extended or adjusted under 35 U.S.C. 154(b) by 0 days.

(21) Appl. No.: 14/613,530

(22) Filed: Feb. 4, 2015

(65) Prior Publication Data

US 2015/0232060 A1     Aug. 20, 2015

Related U.S. Application Data

(60) Provisional application No. 61/939,991, filed on Feb. 14, 2014.

(51) Int. Cl.
*B60R 22/19* (2006.01)
*B60R 22/18* (2006.01)
*B60R 22/02* (2006.01)

(52) U.S. Cl.
CPC ............. *B60R 22/19* (2013.01); *B60R 22/024* (2013.01); *B60R 2022/1818* (2013.01)

(58) Field of Classification Search
CPC ............................. B60R 22/024; B60R 22/19
USPC ............ 297/482, 483; 280/808; 24/182, 298, 24/302, 532
See application file for complete search history.

(56) References Cited

U.S. PATENT DOCUMENTS

| | | | | |
|---|---|---|---|---|
| 2,633,573 A | * | 4/1953 | Sanders | A41F 15/007 297/482 |
| 3,603,615 A | * | 9/1971 | Stehouwer | B60R 22/24 280/808 |
| 3,740,094 A | * | 6/1973 | Hornyak | B60R 22/02 297/481 |
| 4,826,250 A | * | 5/1989 | Ibanez | B60R 22/19 24/171 |
| 5,088,161 A | * | 2/1992 | Robertson | B60R 22/024 24/199 |
| 5,161,824 A | * | 11/1992 | Li | B60R 22/14 280/801.1 |
| D359,711 S | * | 6/1995 | Bell | D11/200 |
| 5,421,615 A | * | 6/1995 | Asagiri | B60R 22/18 297/481 |
| 5,692,806 A | * | 12/1997 | Jones | B60R 22/19 297/483 |
| 6,050,647 A | * | 4/2000 | Thompson | B60R 22/19 297/483 |
| 6,698,633 B2 | * | 3/2004 | Finkelstein | A45F 3/12 224/264 |
| 2006/0273651 A1 | * | 12/2006 | Barnes | B60R 22/024 297/482 |

\* cited by examiner

*Primary Examiner* — Syed A Islam
(74) *Attorney, Agent, or Firm* — McNees Wallace & Nurick LLC (57) ABSTRACT

An attachable tension reducing seat belt device to reduce web tension on the neck, shoulder and chest of motor vehicle occupants or other restraint system webs to slightly reduce tension created by a refraction device preventing a minimal portion of web from being pulled through a web guide by a retractor. Additionally, the device is designed to be either temporarily mounted through easy clip on and removal function which allows the seat belt to be refracted after each use, as is typical, or semi-permanently mounted with the use of a seat belt tongue hooking system which allows the seat belt to remain un-retracted after each use.

18 Claims, 5 Drawing Sheets

DEVICE FOR ADJUSTING TENSION IN SEAT BELTS AND OTHER RESTRAINT SYSTEM WEBS

FIELD OF THE INVENTION

The invention relates generally to devices, systems and methods for adjusting tension in restraint systems. In particular, the invention is directed to a device, system and method for adjusting the tension in a seat belt system.

BACKGROUND

Motor vehicle safety seat belt systems are designed for restraining an occupant to minimize physical harm in the event of a collision or wreck. Automobiles and trucks, for example, typically are a two piece design: a much longer single web forming both the lap area belt and shoulder area belt and a shorter web anchored to the vehicle floor. The longer web typically carries a tongue connector that can slide between the lap area and shoulder area of the longer web. The shorter web anchored to the vehicle floor typically carries a buckle connector. The tongue connector and buckle connector are interlocked to create a singular restraining safety system. Further, the longer web passes through a D-ring pillar guide, which acts as a web guide, on its way to the refractor which stores excess web. The retractor generally has a constant pulling force designed to retract the web and take up slack on the longer web in the shoulder area and the lap area once the tongue connector has been attached to the buckle. Although conventional retractors allow the web to pay out as the seat occupant moves around, the web maintains a certain amount of tension in the neck, shoulder and chest area during use due to the web being spring-loaded. This tension results in pressure on the neck, shoulder and/or chest of the occupant which can result in discomfort and irritation to the user which can lead to added stress, distractions and irritability of motor vehicle safety seat belt system users and a decrease in motor vehicle safety.

It would be therefore be beneficial to provide a device, system and/or method of adjusting the tension on the seat belt or other restraint to allow for the comfort and safety of the user.

SUMMARY OF THE INVENTION

An embodiment of the present invention is directed to a device for adjusting tension in seat belts and other restraint systems. The device allows for reduced tension from the retractor which in turn promotes greater comfort, user ease of motion and increased safety due to less annoying distractions caused by the motor vehicle safety seat belt system. Long distant driving, such as long haul truck drivers and persons taking long trips, will gain greater comfort and less stress as a result of the lessened tension in the neck, shoulder and chest area during use of motor vehicle safety seat belt systems. Additionally, users, such as business persons and travelling salespersons, can also gain a benefit of less wrinkling and abrasion to finer clothing due to the lessened tension of the seat belt against clothing. While this device is designed to provide a more comfortable, stress-reducing way to utilize motor vehicle safety seat belt systems, this device still allows the shoulder harness seat belt to function as intended without compromising safety.

An object of the present invention is to provide a seat belt relief device that avoids the disadvantages of the prior art. Another object of the present invention is to provide a seat belt relief device that is simple to use. Yet another object of the present invention is to provide a seat belt relief device for a seat belt having a shoulder harness utilized by a driver.

An embodiment is directed to a device for adjusting tension of a restraint. The device includes a base member, a web engaging portion and clips. The base member has a top surface and an oppositely facing bottom surface. Side walls and end walls extend between the top surface and the bottom surface. The web engaging portion extends from the bottom surface in a direction away from the top surface. The clips are attached to and extend from the bottom surface. Respective clips are positioned on either side of the web engaging portion, between the web engaging portion and respective side walls. Wherein the web engaging portion frictionally engages webbing of the restraint to prevent or inhibit the movement of the device in a direction along a longitudinal axis of the restraint.

An embodiment is directed to a tension relief device to adjust tension in a seat belt of a vehicle. The tension relief device includes a base member which has a top surface and an oppositely facing bottom surface. Side walls and end walls extend between the top surface and the bottom surface. A web engaging portion extends from the bottom surface in a direction away from the top surface. The base member has a bottom wall which is spaced from the bottom surface of the base member. Clips are attached to and extend from the bottom surface. Respective clips are positioned on either side of the web engaging portion, between the web engaging portion and respective side walls. A hanging mechanism is positioned on the base member to cooperate with a tongue of the seat belt. The bottom wall of the web engaging portion extends a first distance from the bottom surface of the base member. The clips extend a second distance from the bottom surface of the base member. The first distance being greater than the second distance. Wherein the web engaging portion frictionally engage webbing of the seat belt to prevent or inhibit the movement of the device in a direction along a longitudinal axis of the seat belt webbing.

An embodiment is directed to a method of attaching a tension reducing seat belt device to a webbing of a seat belt, the method included: sliding the tension reducing seat belt device onto the webbing of the seat belt, maintaining the tension reducing seat belt device on the webbing of the seat belt, inhibiting movement of the tension reducing seat belt device in a direction along a longitudinal axis of the webbing of the seat belt by frictionally engaging the webbing of the seat belt with a web engaging portion of the tension reducing seat belt device to provide a friction resistance and preventing a pullback tension of a retractor of the seat belt from exceeding the friction resistance of the tension reducing seat belt device. Wherein the seat belt webbing is prevented from being fully retracted, permitting slack in the webbing of the seat belt against the user. In various embodiments, the method also includes hanging a tongue of the seat belt on the tension reducing seat belt device when the seat belt is not in use.

Other features and advantages of the present invention will be apparent from the following more detailed description of the preferred embodiment, taken in conjunction with the accompanying drawings which illustrate, by way of example, the principles of the invention.

DETAILED DESCRIPTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. It will be understood that the spatially relative terms are intended to encompass different orientations of the device in use or operation in addition to the orientation depicted in the figures. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. In the drawings, the relative sizes of regions or features may be exaggerated for clarity. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

The tension reducing device, as illustrated in FIGS. 1 through 10, is applicable to any type of web restraint system where a less than completely tight restraint is desired whether for personal or material restraint. The illustrative embodiments shown and described in this application are directed to the use of the tension reducing device in personal vehicles such as automobiles, trucks or any other vehicle where a personal restraint system is employed. However, the tension reducing device may be used in other applications without departing from the scope of the invention.

Motor vehicle safety seat belt systems currently in use are designed with the purpose of allowing sufficient web slack to be fed from the retractor to permit the user to place the web across the neck, shoulder, chest and lap to create a safe holding unit in case of abrupt stopping or accident while in a vehicle. Unfortunately, once the seat belt web has been secured properly, the pullback tension from the seat belt web can create a confining tightness across the shoulder and chest which can be both irritating and cause discomfort. For those who are shorter in height, the seat belt web can be more of a distraction and irritation about the neck area also. These irritations and discomforts can create a more stressful and distracting vehicle experience which can lead to safety issues related to greater fatigue, general distractions from the road and added irritability.

Figure 1:
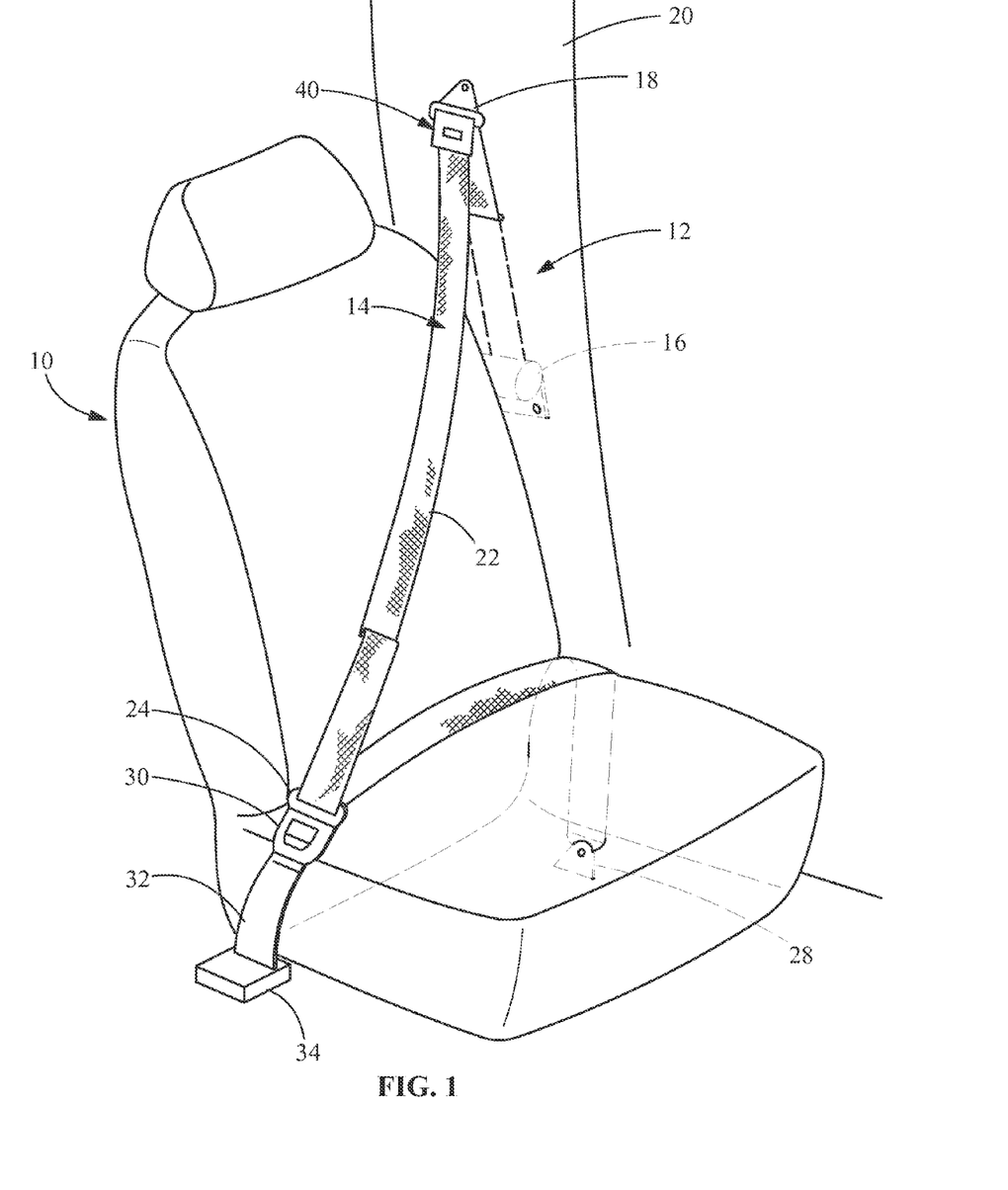
FIG. 1 is a perspective view of an illustrative vehicle seat with personal restraint system, such as a seat belt, with an illustrative tension reducing device of the present invention attached to the seat belt.

Referring to FIG. 1, a vehicle seat 10 and personal restraint system 12 (for example a seat belt) are shown. In the illustrative embodiment shown, the personal restraint system 12 includes a restraint or seat belt webbing 14 which extends from a retractor 16 through and passes through a restraint or seat belt holding member or d-link 18 which is attached or bolted to the vehicle's door post 20. A section 22 of the seat belt webbing 14, referred to as the shoulder belt, extends from the seat belt holding member 18 across a user's neck, shoulder and chest (not shown). The seat belt webbing 14 then passes through the floating seat belt tongue 24. A second section 26 extends from the floating seat belt tongue 24 across the user's lap (not shown) and is attached or bolted to the floor by securing mechanism 28. When in use, the seat belt tongue 24 is pushed into or engages a locking buckle 30 which is also attached bolted to the vehicle floor by strap 32 and mechanism 34. In the embodiment shown in FIG. 1, an illustrative embodiment of a tension reducing seat belt device 40 according to the present invention is placed on the user side of the seat belt holding member 18 to prevent the full retraction of the seat belt webbing 14 by the retractor 16, as will be more fully described. While the device 40 is referred to as a tension reducing seat belt device, the device 40 may also be referred to as a tension relief device, a device for adjusting tension and/or a device for increasing the comfort of the user.

As best shown in FIGS. 4 through 7, the tension reducing seat belt device 40 includes a top surface 42 and an oppositely facing bottom surface 44. Side walls 46 and end walls 48 extend between the top surface 46 and the bottom surface 48 to form a base member 50. However, other configurations of the base member 50 may be used without departing from the scope of the invention.

A hanging mechanism 52 is positioned on the top surface 42 of the base member 50 and extends in a direction away from the bottom surface 44. In the embodiment shown, the hanging mechanism 52 is magnetic, but other types of hanging mechanisms 52 can be used, such as, but not limited to, the hook shown in FIG. 9.

A web engaging portion 54 extends from the bottom surface 44 in a direction away from the top surface 42. In the embodiment shown, the web engaging portion 54 extends across the entire width of the bottom surface 44 from one end wall 48 to the other end wall 48. However, other configurations of the web engaging portion 54 may be used without departing from the scope of the invention. The web engaging portion 54 may be integrally formed with the base member 50 or may be a separate piece which is attached to the base member 50 using known methods of attachment, such as, but not limited to, glue. In the illustrative embodiment shown, the web engaging portion 54 may be made from material which has a non-slip surface, such as, but not limited to, rubber.

However, other materials can be used without departing from the scope of the invention.

Figure 3:
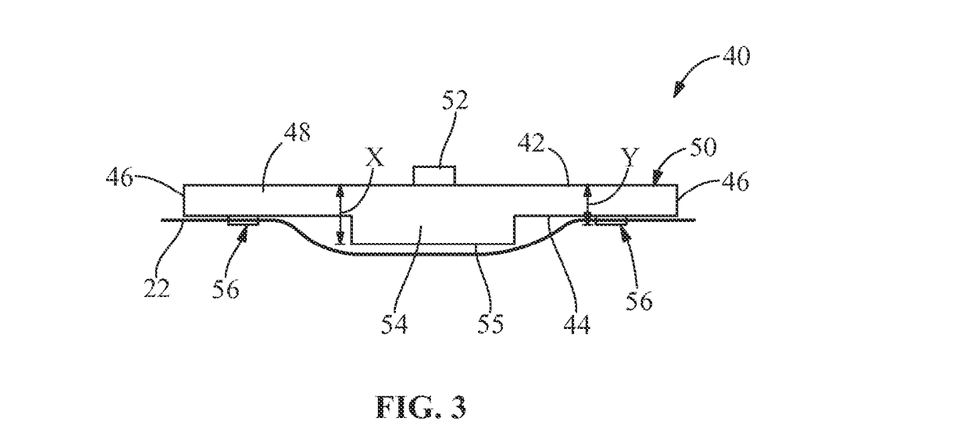
FIG. 3 is an end view of the tension reducing device of FIG. 1 with the seat belt positioned therein.
Figure 4:
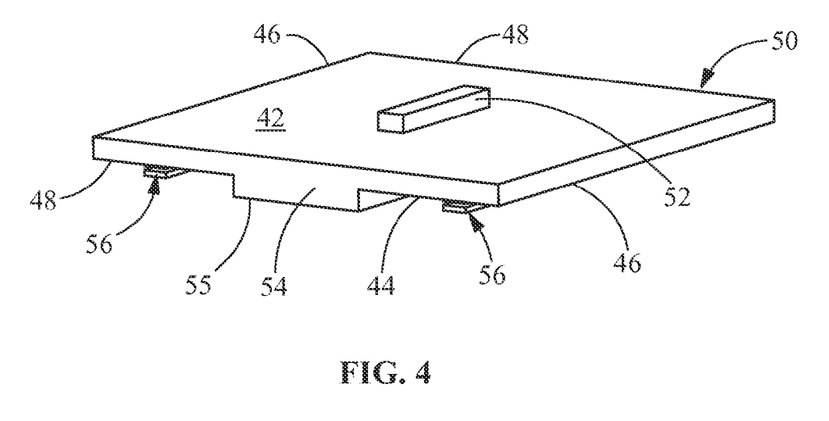
FIG. 4 is a top perspective view of the tension reducing device of FIG. 1 removed from the seat belt.
Figure 5:
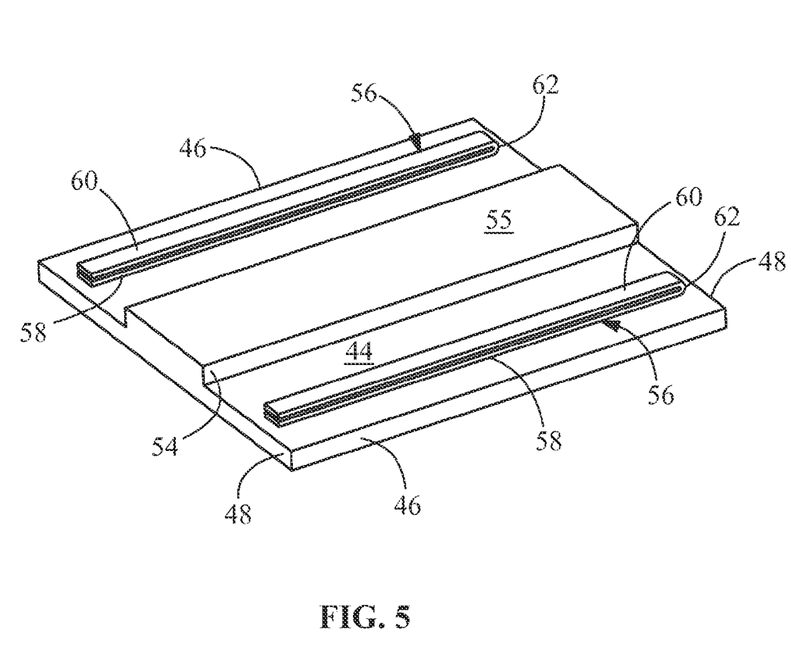
FIG. 5 is a bottom perspective view of the tension reducing device of FIG. 4.
Figure 6:
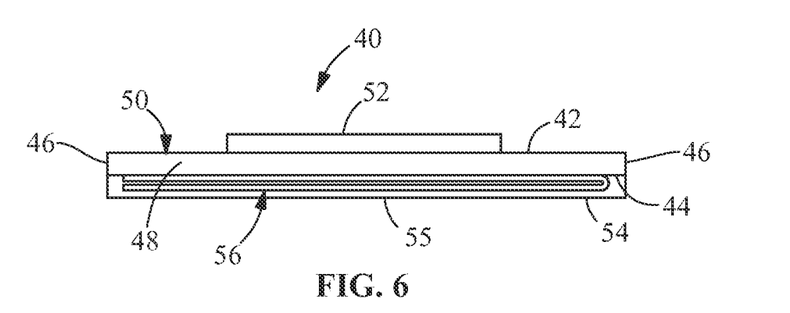
FIG. 6 is a side view of the tension reducing device of FIG. 4.
Figure 7:
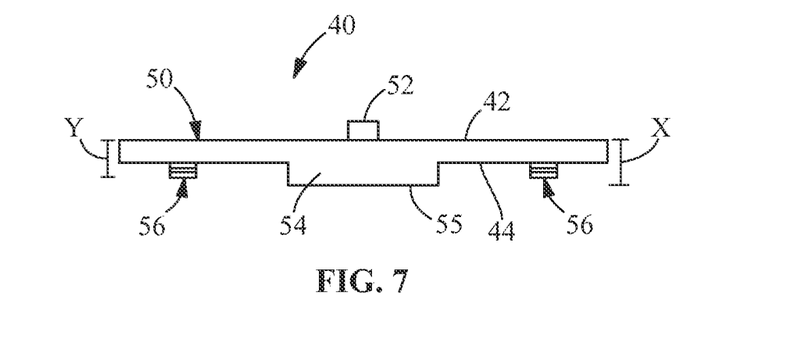
FIG. 7 is an end view of the tension reducing device of FIG. 4.

Clips 56 are attached to and extend from the bottom surface 44. The clips 56 each have a mounted arm 58, which is attached to the bottom surface 44, and a resilient arm 60 which is able to be resiliently deformed about the mounted arm 58 and a U-shaped connection 62 between the mounted arm 58 and the resilient arm 60. The clips 56 are positioned on either side of the web engaging portion 54 between the web engaging portion 54 and respective side walls 46. In the embodiment shown in FIGS. 4 through 7, the clips 56 extend across essentially the entire width of the bottom surface 44 but are offset from the end walls 48. However, other configurations of the clips 56 may be provided, such as, but not limited to, the clips 56 shown in FIG. 10 which extend beyond one of the end walls 48. As best shown in FIG. 3, a bottom wall 55 of the web engaging portion 54 extends a distance X from the bottom surface 44 which is greater than the distance Y that the clips 56 extend from the bottom surface 44.

Figure 2:
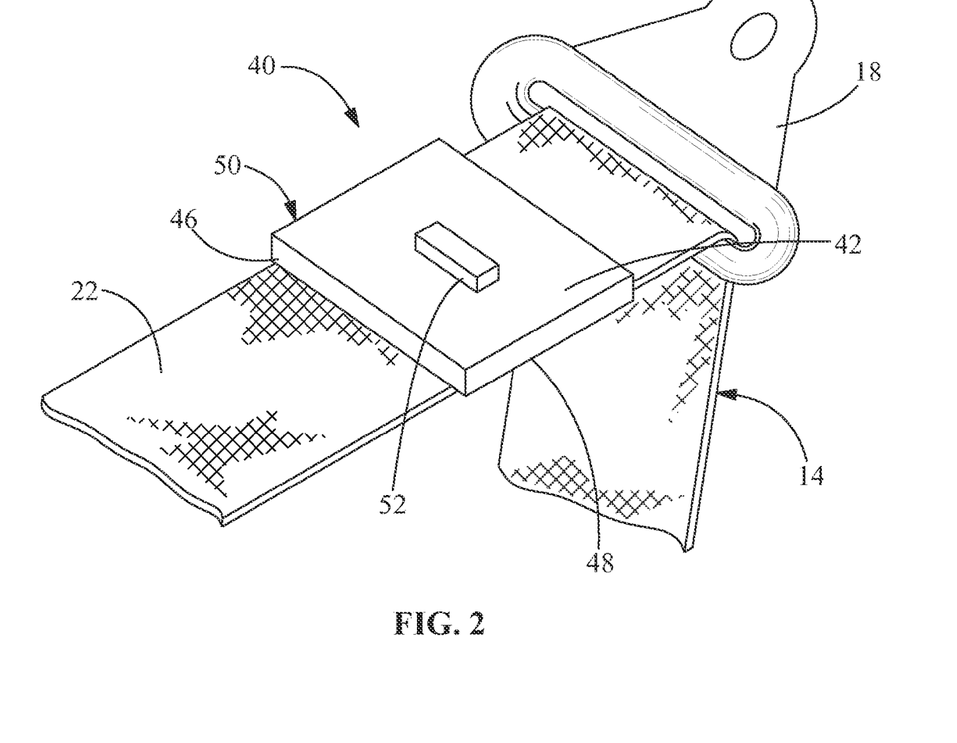
FIG. 2 is a perspective view of the tension reducing device of FIG. 1 positioned proximate a seat belt holding member.

In use, the tension reducing seat belt device 40 is inserted on the section 22 of the seat belt webbing 14, as shown in FIGS. 1 and 2. As the tension reducing seat belt device 40 is moved into engagement with the webbing 14, the webbing 14 is moved into engagement with the clips 56. The resilient arms 60 are able to be resiliently deformed away from the mounted arms 58 to provide sufficient space between the arms 58, 60 to facilitate the insertion of the webbing 14 into the clips 56. As the tension reducing seat belt device 40 is moved into engagement with the webbing 14, the webbing 14 also engages the web engaging portion 54, as shown in FIG. 3. With the tension reducing seat belt device 40 fully inserted on the webbing 14, the resilient arms 60 return toward there unstressed position to hold the tension reducing seat belt device 40 securely onto the webbing 14. The webbing 14 extends over the web engaging portion 54 and is bent into the clips 56. The cooperation of the webbing 14 with the web engaging portion 54 creates a frictional engagement between the webbing 14 and the web engaging portion 54. The interaction of the webbing 14 with the clips 56 and the web engaging portion 54 creates sufficient resistance to prevent the unwanted movement of the tension reducing seat belt device 40 relative to the webbing 14.

In use, the tension reducing seat belt device 40 prevents the retractor 16 from pulling the personnel restraint system 12 tightly against the user's neck, shoulder and chest to offer sufficient relief to create a comfortable fit while maintaining the integrity and safety of the personal restraint system 12. This prevents a portion of seat belt webbing 14 from being pulled through the holding member 18 by the retractor 16.

The tension reducing seat belt device 40 of the present invention provides a minimal relaxation from the pullback tension from the retractor 16, thereby creating a more comfortable, relaxed driving experience by greatly reducing the afore mentioned difficulties. The use of the tension reducing seat belt device 40 does not interfere or reduce the effectiveness or safety of the personnel restraint system 12.

Once the user has completed buckling the personnel restraint system 12, the user may slide the tension reducing seat belt device 40 onto the set belt webbing 14 to create a minimal amount of slack against the seat belt holding member 18. Alternatively, the tension reducing seat belt device 40 may be already attached to the personnel restraint system 12 from a previous use. For example, the attachment of the tension reducing seat belt device 40 is secured to the seat belt webbing 14 such that upon retraction of the seat belt webbing 14, the tension reducing seat belt device 40 engages the seat belt holding member 18 approximately one inch prior to the full retraction of the slot 14 caused by the retractor 16. Consequently, one inch of additional slack is provided in the seat belt webbing 14. This additional one inch of slack allows a user in a vehicle to gain greater comfort with no compromise to the user's safety.

As stated, the tension reducing seat belt device 40 is designed for both singular event usage and semi-permanent installation. This allows the user to leave the tension reducing seat belt device 40 attached to the seat belt webbing 14 for recurrent use by the user or the tension reducing seat belt device 40 can easily be slid off the seat belt webbing 14 after each vehicle usage. As the tension reducing seat belt device 40 is maintained on the seat belt webbing 14 by the clips 56, the tension reducing seat belt device 40 can be easily installed and removed from the seat belt webbing 14. This allows flexibility of use for the user as well as convenience.

When applied to the seat belt webbing 14, the web engaging portion 54 and the clips 56 cooperate to position the seat belt webbing 14 in the position best shown in FIG. 3. In this position, the web engaging portion 54 cooperates with the seat belt webbing 14 to prevent or inhibit the movement of the tension reducing seat belt device 40 in a direction along the longitudinal axis of the seat belt webbing 14. The web engaging portion 54 prevents the seat belt webbing 14 from extending in a straight line between the clips 56. Instead, as the bottom wall 55 of the web engaging portion 54 extends from the bottom surface 44 a greater distance than the clips 56, the seat belt webbing 14 is curved or snakes through the through the clips 56 and the web engaging portion 54. Consequently, as tension is applied to the seat belt webbing 14 along the longitudinal axis, the seat belt webbing 14 engages the web engaging portion 54. This engagement between the seat belt webbing 14 and the web engaging portion 54 causes the friction to be applied by the web engaging portion 54 to the seat belt webbing 14, thereby preventing or inhibiting the movement of the tension reducing seat belt device 40 in a direction along the longitudinal axis of the seat belt webbing 14. The frictional forces supplied are sufficient to overcome the pullback tension from the retractor 16. Stated differently, the addition of the web engaging portion 54 provides a greater degree of linear resistance against the seat belt webbing 14 to prevent the pullback tension from the retractor 16 to exceed the friction resistance of the tension reducing seat belt device 40 and thereby holds the seat belt webbing 14 in a consistent location, which is not fully retracted, permitting a minimal slack in the seat belt webbing 14 against the user. The tension reducing seat belt device 40 prevents the seat belt webbing 14 from being fully retractable.

Figure 8:
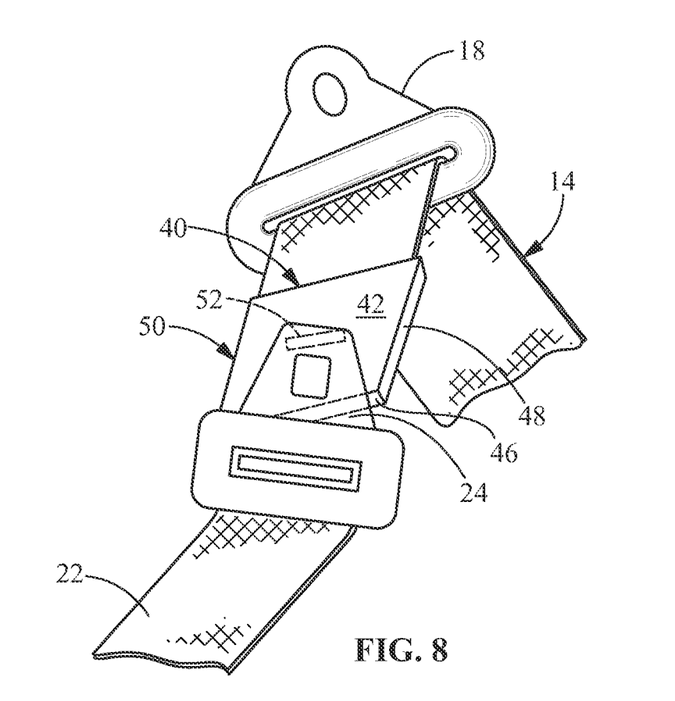
FIG. 8 is a perspective view of the tension reducing device of FIG. 1 positioned proximate a seat belt holding member, a tongue of the seat belt positioned is proximate the tension reducing device and is maintained in position relative thereto.
Figure 9:
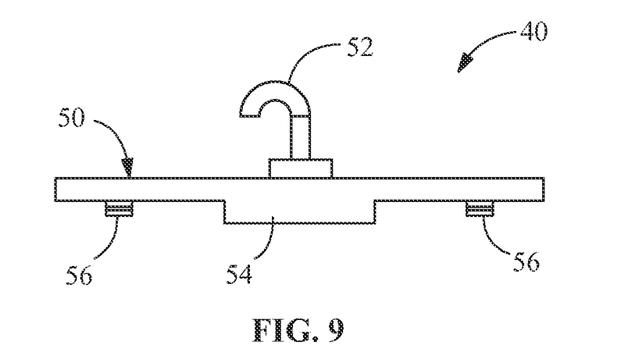
FIG. 9 is an end view of a first alternate illustrative tension reducing device.
Figure 10:
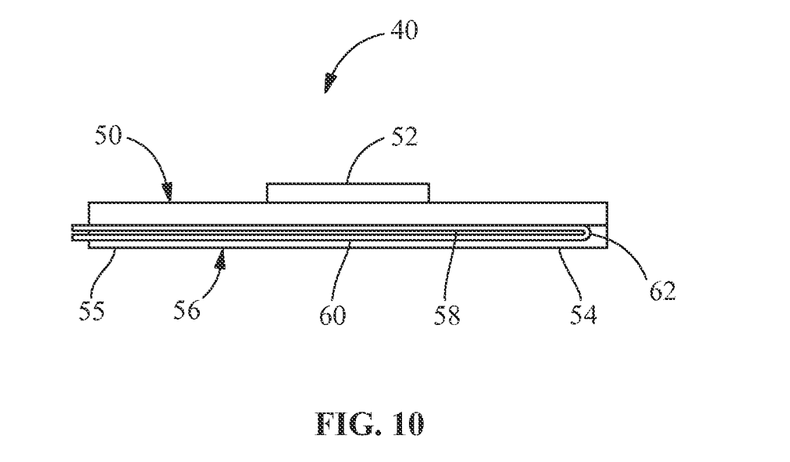
FIG. 10 is an end view of a second alternate illustrative tension reducing device.

The hanging mechanism 52 facilitates the tension reducing seat belt device 40 to remain attached to the seat belt webbing 14 when the personnel restraint system 12 is not being used. In the illustrative embodiment shown in FIG. 8, the hanging mechanism 52 is mounted on the top surface 42 of the tension reducing seat belt device 40. When the personnel restraint system 12 is not being used, the user detaches the seat belt tongue 24 from the seat belt locking buckle 30 and hangs the seat belt tongue 24 on the hanging mechanism 52 of the tension reducing seat belt device 40, allowing the user to exit the vehicle without being tangled with the personnel restraint system 12. As shown in FIG. 8, the hanging mechanism 52 is magnetic and cooperates with the metal seat belt tongue 24. The magnetic pull of the magnetic hanging mechanism 52 maintains the seat belt tongue 24 is removable engagement therewith. Alternatively, the hanging mechanism 52 may be a hook, as shown in FIG. 9, or other mechanism which cooperates with the seat belt tongue 24 to removably maintain the seat belt tongue 24 is position relative to the hanging mechanism 52, The use of the hanging mechanism 52 facilitates the semi-permanent installation of the tension reducing seat belt device 40 on the seat belt webbing 14. The semi-permanent installation of the tension reducing seat belt device 40 on the seat belt webbing 14 reduces wear and tear on both the tension reducing seat belt device 40 and the seat belt webbing 14, as there is minimal user installation and removal of the tension reducing seat belt device 40.

The use of the tension reducing seat belt device 40 and the hanging mechanism 52 allows the seat belt webbing 14 of the personnel restraint system 12 to be maintained or preset in the desired position when not in use. Consequently, when the user enters the vehicle and applies the personnel restraint system 12, the tension reducing seat belt device 40 and the seat belt webbing 14 are properly adjusted according the user's preference.

As the seat belt tongue 24 is maintained in position relative to the hanging mechanism 52 when not in use, the seat belt webbing 14 is held off the floor, thereby allowing the seat belt webbing 14 to be kept clean. In addition, as the semi-permanent installation of the tension reducing seat belt device 40 on the seat belt webbing 14 prevents the full traction of the seat belt webbing 14 into the retractor 16, the seat belt webbing 14 is exposed to less wear and tear or frictional rubbing by being tracked through and over the edges of the belt holding member 18.

In the embodiment shown, the tension reducing seat belt device 40 has no moving parts and is a bonded, singular unit composed of highly durable components which greatly reduce wear and tear and increase longevity of use the tension reducing seat belt device 40.

Several illustrative figures are provided to describe the general design intended to accomplish the function and purpose of the tension reducing seat belt device. Although the figures presented are representative of the basic design to accomplish the purpose of the tension reducing seat belt device, they are in no way definitive of the possible specific designs nor configurations which are proposed with this application. Consequently, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. The details, dimensions, angles and features shown in the figures are for illustrative purpose and, as such, do not exclude other dimensions, angles and features design of the tension reducing seat belt device which are supported by the claims as set forth in this application. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A device for adjusting tension of a restraint, the device comprising:
    a base member having a top surface and an oppositely facing bottom surface, side walls and end walls extend between the top surface and the bottom surface;
    a web engaging portion extending from the bottom surface in a direction away from the top surface;
    clips attached to and extending from the bottom surface, respective clips positioned on either side of the web engaging portion, between the web engaging portion and respective side walls;
    a hanging mechanism is positioned on the base member and which is adapted to cooperate with a tongue of the restraint, thereby allowing the tongue to hang from device when the restraint is not being used;
    wherein the web engaging portion is adapted to frictionally engage webbing of the restraint to prevent or inhibit the movement of the device in a direction along a longitudinal axis of the restraint.

2. The device as recited in claim 1, wherein the hanging mechanism is magnetic.

3. The device as recited in claim 1, wherein the hanging mechanism is a hook.

4. The device as recited in claim 1, wherein the web engaging portion extends across the bottom surface from a first respective end wall to a second respective end wall.

5. The device as recited in claim 1, wherein the web engaging portion is integrally formed with the base member.

6. The device as recited in claim 1, wherein the web engaging portion is a separate piece which is attached to the base member.

7. The device as recited in claim 1, wherein a bottom wall of the web engaging portion is a non-slip surface.

8. The device as recited in claim 1, wherein the clips have mounted arms which are attached to the bottom surface of the base member, resilient arms which are able to be resiliently deformed about the mounted arms, and connections between the mounted arms and the resilient arms.

9. The device as recited in claim 1, wherein the clips are offset from the end walls of the base member.

10. The device as recited in claim 1, wherein the clips extend beyond at least one end wall of the base member.

11. The device as recited in claim 1, wherein a bottom wall of the web engaging portion extends a first distance from the bottom surface of the base member and the clips extends a second distance from the bottom surface of the base member, the first distance being greater than the second distance.

12. A tension relief device to adjust tension in a seat belt of a vehicle, the tension relief device comprising:
    a base member having a top surface and an oppositely facing bottom surface, side walls and end walls extend between the top surface and the bottom surface;
    a web engaging portion extending from the bottom surface in a direction away from the top surface, the base member having a bottom wall which is spaced from the bottom surface of the base member;
    clips attached to and extending from the bottom surface, respective clips positioned on either side of the web engaging portion, between the web engaging portion and respective side walls;
    a hanging mechanism positioned on the base member to cooperate with a tongue of the seat belt;
    the bottom wall of the web engaging portion extending a first distance from the bottom surface of the base member and the clips extending a second distance from the bottom surface of the base member, the first distance being greater than the second distance;

wherein the web engaging portion is adapted to frictionally engage webbing of the seat belt to prevent or inhibit the movement of the device in a direction along a longitudinal axis of the seat belt webbing.

13. The tension relief device as recited in claim 12, wherein the hanging mechanism is magnetic.

14. The tension relief device as recited in claim 12, wherein the hanging mechanism is a hook.

15. The tension relief device as recited in claim 12, wherein the web engaging portion extends across the bottom surface from a first respective end wall to a second respective end wall.

16. The tension relief device as recited in claim 12, wherein the web engaging portion is integrally formed with the base member.

17. The tension relief device as recited in claim 12, wherein the web engaging portion is a separate piece which is attached to the base member.

18. A method of attaching a tension reducing seat belt device to a webbing of a seat belt, the method comprising:

sliding the tension reducing seat belt device onto the webbing of the seat belt;

positioning a web engaging portion of the tension reducing seat belt device on the webbing of the seat belt to maintain the tension reducing seat belt device on the webbing of the seat belt;

inhibiting movement of the tension reducing seat belt device in a direction along a longitudinal axis of the webbing of the seat belt by frictionally engaging the webbing of the seat belt with the web engaging portion of the tension reducing seat belt device to provide a friction resistance;

preventing a pullback tension of a retractor of the seat belt from exceeding the friction resistance of the tension reducing seat belt device;

hanging a tongue of the seat belt on a hanging mechanism of the tension reducing seat belt device when the seat belt is not in use;

wherein the seat belt webbing is prevented from being fully retracted, permitting slack in the webbing of the seat belt against the user.

\* \* \* \* \*